Feb. 14, 1961     A. E. HAYES, JR     2,972,065
PULSE RECTIFIER AND PHASE INVERTER
Filed July 20, 1959
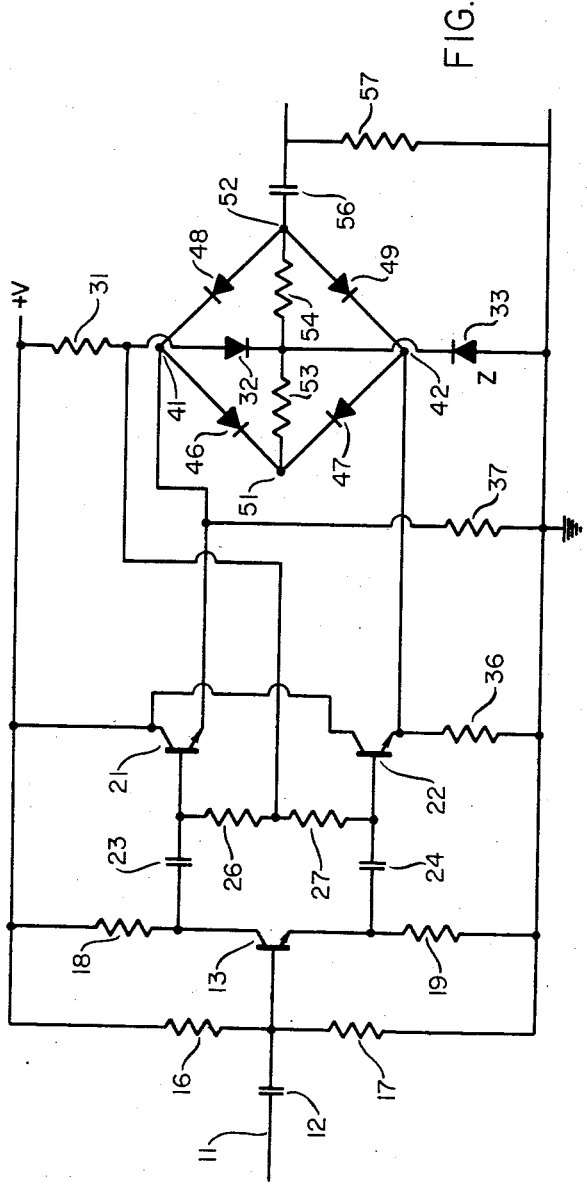
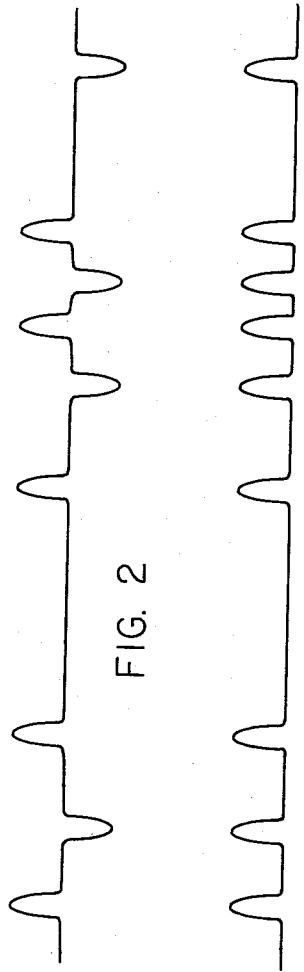
ALBERT E. HAYES JR.
*INVENTOR.*
BY
*ATTORNEYS*

United States Patent Office 2,972,065
Patented Feb. 14, 1961

2,972,065
PULSE RECTIFIER AND PHASE INVERTER

Albert E. Hayes, Jr., Redwood City, Calif., assignor to Ampex Corporation, Redwood City, Calif., a corporation of California Filed July 20, 1959, Ser. No. 828,253
3 Claims. (Cl. 307—88.5)

This invention relates generally to a pulse rectifier and phase inverter.

In computers and digital handling systems, it is often necessary to convert a series of random positive and negative pulses into a series of uni-directional pulses having the same interpulse timing as the original signal. Many prior art circuits suitable for rectifying and phase inverting are not suitable for use in systems of the above character. Many of these circuits contain storage elements such as capacitors, and with random pulse input, the circuit alters the interpulse period by responding differently for different interpulse periods.

It is a general object of the present invention to provide an improved pulse rectifier and phase inverter.

It is another object of the present invention to provide a transistorized pulse rectifier and phase inverter.

It is a further object of the present invention to provide a transistorized pulse rectifier and phase inverter which is relatively insensitive to temperature changes.

It is still another object of the present invention to provide a pulse rectifier and phase inverter which has a response which is relatively independent of interpulse timing.

These and other objects of the invention will become more clearly apparent from the following description when taken in conjunction with the accompanying drawing.

Referring to the drawings:

Figure 1 is a schematic diagram of a pulse rectifier and phase inverter in accordance with the invention;

Figure 2 illustrates the input to the phase inverter of Figure 1; and

Figure 3 illustrates the output from the phase inverter of Figure 1 with an input of the character shown in Figure 2.

The input signal which is a series of random positive and negative pulses having different interpulse periods is applied to the terminal 11 and coupled by capacitor 12 to the base of the transistor 13. A suitable bias voltage is applied to the base of the transistor from the resistive divider network including the resistors 16 and 17 connected between the plus voltage supply +V and ground.

The transistor 13 is connected as a split load phase inverter. The collector is resistively connected 18 to the voltage supply line +V, and the emitter is resistively connected, 19, to ground. The split phase output is capacitively coupled to the base of the transistors 21 and 22 by the capacitors 23 and 24.

Suitable base voltage is applied to the transistors 21 and 22 through the resistors 26 and 27, respectively. A relatively constant voltage is applied to the common terminal of the resistors 26 and 27 from the series combination of resistor 31, forwardly biased diode 32, and the zener or reference diode 33. The action of the reference diode 33 and forwardly biased diode 32 is to provide a voltage at the common terminal of resistors 26 and 27 which is the voltage of the reference diode plus the forward drop of the diode 32.

The transistors 21 and 22 are connected in an emitter-follower circuit. The collectors are connected to the plus voltage supply and the emitters are resistively connected, resistors 36 and 37, to the ground terminal. The output from the emitter-follower is applied to the opposite pair of terminals 41 and 42 of the bridge circuit formed by the rectifying diodes 46—49. The other pair of bridge terminals 51 and 52 is resistively connected by the resistors 53 and 54 to the reference diode 33. The voltage applied at the common terminal of the resistors is the voltage of the reference diode. The output signal is capacitively coupled from the terminal 52 by the capacitor 56 and applied across the load resistor 57.

It is observed that with zero applied input signal the voltage at the common terminal of resistors 53 and 54 is the same as the voltage appearing at the emitters of the transistors 21 and 22. The voltage on the emitters will be less than the voltage applied to the common terminal of resistors 26 and 27 by an amount equal to the resistance drop in the resistors and emitter to base drop in the transistors 21 and 22. The voltage applied to terminals 51 and 52 is less than the voltage applied to the common terminal of resistors 26 and 27 by an amount equal to the resistance drop in resistors 53 and 54 and the forward drop of diode 32.

If the transistors 21 and 22 and the diode 32 are made of the same material (i.e., silicon or germanium) and have substantially the same type of junction, then any temperature variations will effect the voltage drop equally and the voltage at the terminals 51 and 52 and the emitters is substantially independent of temperatures.

It is further observed that there are no energy storage elements in the non-linear or rectifying portions of the circuit. Consequently, the circuit will respond the same regardless of the interpulse timing of the random pulses.

In operation, the signal to be rectified and inverted is applied to the terminals 11 where it is capacitively coupled to the split load phase inverter 13. The output from the split load phase inverter is applied to the emitter-followers and thence to the terminals 41 and 42 of the bridge rectifier. The junction of the resistors 53 and 54 remains at a substantially constant voltage with the terminals 41 and 42 varying therefrom only an amount which is dependent upon the input signal. Opposite pairs of diodes conduct to provide a rectified signal at the terminal 52. The output signal will be directly related to the input signal and will not be affected by temperature changes or the like.

I claim:

1. A pulse rectifier and phase inverter comprising a phase splitter adapted to receive an input signal and split and invert the same, a pair of transistors each having emitter, base and collector electrodes connected in emitter-follower circuits, the bases of said transistors connected to receive signals from the phase splitter, a bridge rectifying circuit having first and second pairs of terminals, means for connecting the first pair of bridge terminals to the emitters of said transistors, means for deriving a reference voltage, resistive means for applying said reference voltage to the second pair of bridge terminals, and means for applying the reference voltage to the base of said transistors.

2. A pulse rectifier and phase inverter as in claim 1 wherein said means for applying the reference voltage to the base of the transistors includes the voltage drop across a forwardly biased semiconductive rectifying junction, said semiconductive junction being of the same material as said pair of transistors and said junction being of the same type as the base-emitter junctions of said transistors.

3. A pulse rectifier and phase inverter as in claim 1 wherein a pair of serially connected resistors is connected across the second pair of bridge terminals and the reference voltage is connected to the common terminal and wherein a pair of serially connected resistors is connected across the base of the transistors and a forwardly biased rectifying junction is connected between the common terminals of the base resistors and the common terminal of the bridge resistors.

References Cited in the file of this patent
UNITED STATES PATENTS 2,486,154    Hadfield  ---------------- Oct. 25, 1949

OTHER REFERENCES

"Equipment Review," page 44, Audio, January 1958.
"Push-Pull Transistor Servo Amplifier" (R. T. Henszey), page 156, Electronics, December 1956.